US009898909B2

(12) United States Patent
Hasan et al.

(10) Patent No.: US 9,898,909 B2
(45) Date of Patent: Feb. 20, 2018

(54) METHOD AND APPARATUS FOR TAMPER DETECTION

(71) Applicant: NOKIA SOLUTIONS AND NETWORKS OY, Espoo (FI)

(72) Inventors: Afm Rezaul Hasan, Glendale Hts., IL (US); Russell Rezaian, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/031,066

(22) PCT Filed: Jan. 30, 2015

(86) PCT No.: PCT/US2015/013743
§ 371 (c)(1),
(2) Date: Apr. 21, 2016

(87) PCT Pub. No.: WO2016/122583
PCT Pub. Date: Aug. 4, 2016

(65) Prior Publication Data
US 2016/0358439 A1    Dec. 8, 2016

(51) Int. Cl.
*G08B 13/24* (2006.01)
*G08B 13/06* (2006.01)
*G08B 29/04* (2006.01)
*H04L 9/14* (2006.01)

(52) U.S. Cl.
CPC ......... *G08B 13/2434* (2013.01); *G08B 13/06* (2013.01); *G08B 29/04* (2013.01); *H04L 9/14* (2013.01); *H04L 2209/24* (2013.01)

(58) Field of Classification Search
CPC .... G08B 13/06; G08B 13/2434; G08B 29/04; H04L 2209/24; H04L 9/14
USPC ........................................................ 340/572.8
See application file for complete search history.

(56) References Cited

U.S. PATENT DOCUMENTS

| 4,464,494 | A | 8/1984 | King et al. |
| 4,736,857 | A | 4/1988 | Monico, Jr. et al. |
| 5,397,812 | A | 3/1995 | Usami et al. |
| 8,334,773 | B2 * | 12/2012 | Cova ...................... G06Q 10/08 340/572.1 |

(Continued)

FOREIGN PATENT DOCUMENTS

| CN | 101180663 A | 5/2008 |
| CN | 102549626 A | 7/2012 |
| CN | 102687039 A | 9/2012 |

OTHER PUBLICATIONS

International Search Report & Written Opinion dated Apr. 9, 2015 corresponding to International Patent Application No. PCT/US2015/013743.

(Continued)

*Primary Examiner* — Nader Bolourchi
(74) *Attorney, Agent, or Firm* — Squire Patton Boggs (US) LLP

(57) ABSTRACT

An apparatus secured to a device includes a fastener, an adhesive secured to the fastener, an electric circuit configured to measure a property, a memory configured to store the property, and at least one Key to access the stored property, wherein the apparatus is configured to detect an unauthorized opening of the device.

20 Claims, 3 Drawing Sheets

(56) References Cited

U.S. PATENT DOCUMENTS

| | | | |
|---|---|---|---|
| 8,456,302 B2* | 6/2013 | Stevens | G08B 13/02 340/506 |
| 2002/0067264 A1 | 6/2002 | Soehnlen | |
| 2002/0129236 A1 | 9/2002 | Nuutinen | |
| 2005/0225445 A1 | 10/2005 | Petersen et al. | |
| 2010/0026326 A1 | 2/2010 | Bartley et al. | |
| 2012/0043383 A1 | 2/2012 | Liu | |
| 2012/0060030 A1 | 3/2012 | Lamb | |
| 2013/0023748 A1 | 1/2013 | Harhen et al. | |
| 2013/0283606 A1 | 10/2013 | Cok et al. | |

OTHER PUBLICATIONS

First Office Action dated Mar. 20, 2017 corresponding to Chinese Patent Application No. 201580001848.9 and English translation thereof.

* cited by examiner

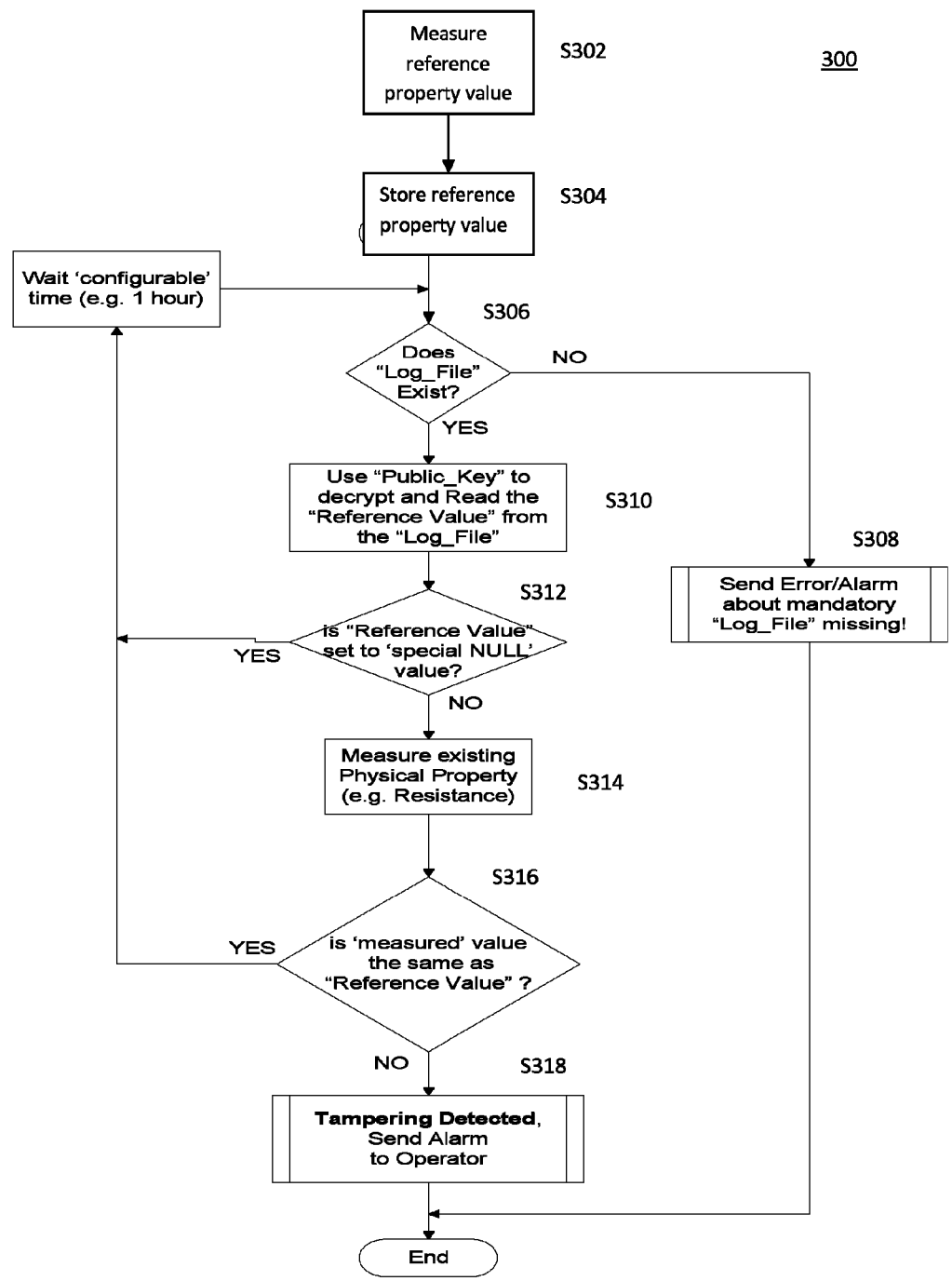

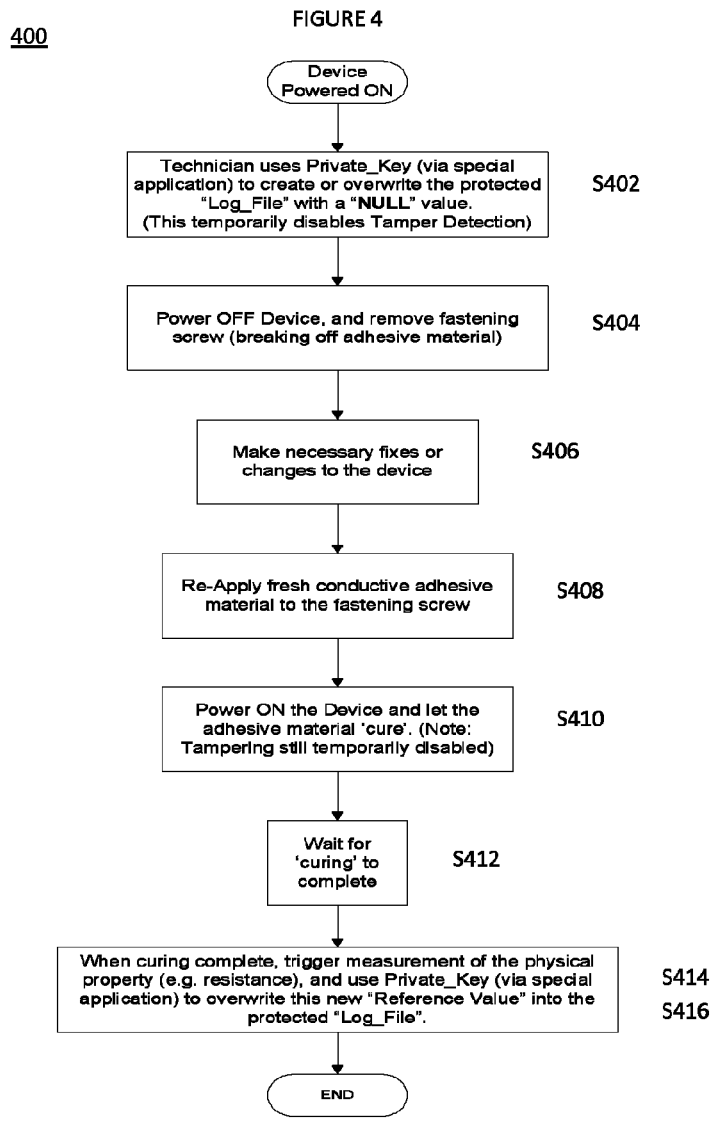
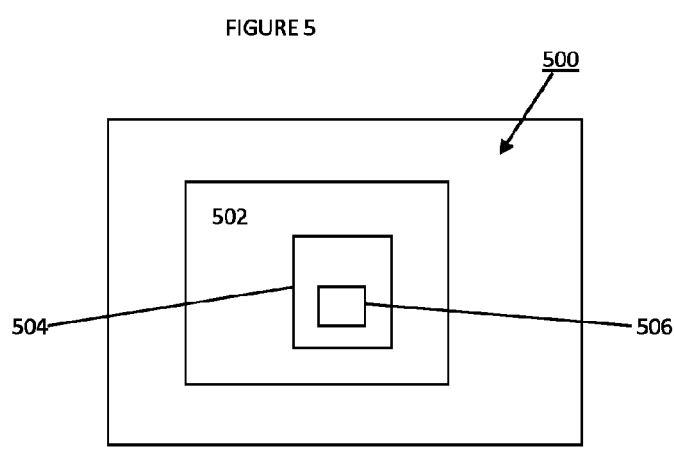

METHOD AND APPARATUS FOR TAMPER DETECTION

FIELD OF TECHNOLOGY

This disclosure relates generally to the field of tamper detection, and more particularly to a method and apparatus for remote and electronic tamper detection.

BACKGROUND

Telecommunications operators typically deploy thousands of Access Points, Micro Base Stations, or other network equipment across a large geographic area. Such network equipment is generally installed in close proximity to subscribers, and is typically located on such unprotected areas as walls or light poles, for example.

As a result of their relatively easy access, these types of network equipment provide relatively easy physical access to potential attackers, and accordingly are susceptible to tampering by unauthorized persons. Such tampering could lead to physical damage of the equipment or unauthorized changes being made to the equipment. Currently, it is not possible to detect if such an unauthorized tampering of the network equipment were to occur without physical monitoring or inspection of the equipment, which is impractical in most situations and may be impossible in situations where the equipment is spread out over a large geographic area.

SUMMARY

An apparatus secured to a device includes a fastener, an adhesive secured to the fastener, an electric circuit configured to measure a property, a memory configured to store the property, and at least one Key to access the stored property, wherein the apparatus is configured to detect an unauthorized opening of the device.

A method includes measuring a reference property value of a circuit, storing the reference property value of the circuit in a device, measuring a current property value of the circuit, comparing the reference property value of the circuit to the current property value of the circuit, and initiating an alarm at the device if the current property value does not match the reference property value.

A system for tamper detection includes a device in a telecommunications network, and an apparatus secured to the device, the apparatus including: a fastener; an adhesive secured to the fastener; an electric circuit configured to measure a property; and at least one Key configured to access the property value, wherein the property value is stored on the device, wherein the apparatus is configured to: measure a reference property value of the circuit; store the reference property value of the circuit in the device; measure a current property value of the circuit; compare the reference property value of the circuit to the current property value of the circuit; and initiate an alarm at the device if the current property value does not match the reference property value.

DESCRIPTION OF THE SEVERAL VIEWS OF THE DRAWINGS

To aid in the proper understanding of the present disclosure, reference should be made to the accompanying drawings, wherein:

FIG. 3 is a flow chart illustrating a method in accordance with the present disclosure;

FIG. 4 is a flow chart illustrating a method for opening an apparatus in accordance with the present disclosure; and FIG. 5 is a diagram of a system in accordance with the present disclosure.

DETAILED DESCRIPTION

Figure 1:
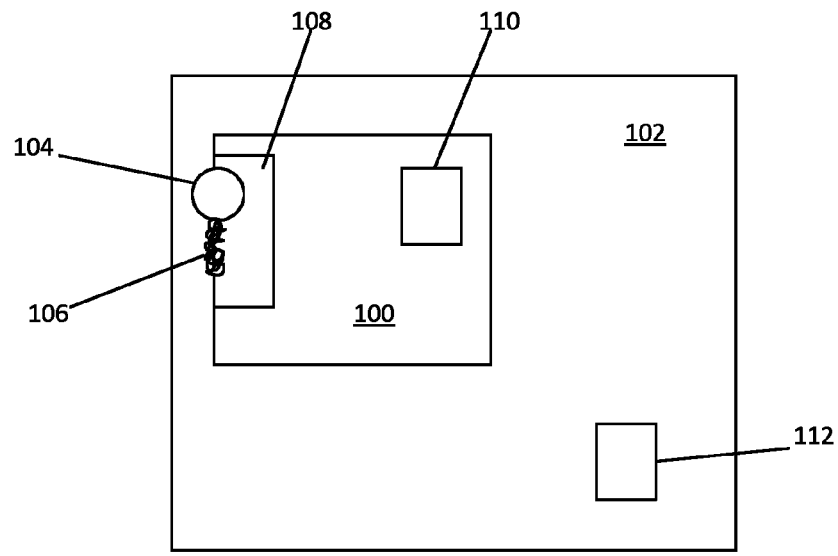
FIG. 1 is an apparatus in accordance with the present disclosure.

In accordance with the present disclosure, and as shown in FIG. 1, an apparatus 100 is provided for detecting tampering or unauthorized opening of a device, such as an access point, a micro-base station, a base station, or a network equipment device. The apparatus 100 is secured to the device 102, and includes a fastener 104, and an adhesive 106 secured to the fastener. In the present disclosure, the fastener 104 is a threaded screw, but it is contemplated that the fastener could also be, for example, a bolt, a rod, a hook, or any other known fastening device. The adhesive 106 is configured for being secured around the screw/fastener 104. Further, and as will be described in further detail below, the adhesive 106 is configured such that upon curing, it becomes brittle.

The adhesive 106 could be of the type that includes a wide range of specific measurable physical properties (i.e., variant electrically conductive adhesives intended to cure to different narrow ranges of resistance), such that even if an unauthorized user attempted to reseal the device 102 with the same general brand of adhesive, it is unlikely that they would be aware of the exact variant being used on the device. Alternatively, the adhesive 106 could be a conductive ink, for example. Although not limited to this configuration, in the present disclosure, the fastener 104 can be made of a non-conductive material, and the adhesive 106 can be made of a conductive material. However, it is appreciated that other configurations may also be possible (such as conductive fastener with conductive adhesive; and conductive fastener with non-conductive adhesive).

As a result of the conductive/non-conductive relationship between the fastener 104 and the adhesive 106 secured thereto, a circuit is formed. Accordingly, the apparatus 100 also includes an electric circuit 108 configured to measure a property of the circuit formed by the adhesive material 106 being secured over the fastener 104. For example, the electric circuit 108 can be configured to measure a resistance value formed by the adhesive 106 being secured to the fastener 104. However, it is to be understood that other physical properties could also be measured by the electric circuit 108, such as, for example, capacitance of the circuit. The measured physical property exhibits a change upon unauthorized tampering/opening of the device 102, and can be remotely detected, as will be described in further detail below. It is further contemplated that the physical property is configured to retain its value (within a narrow range of variation) regardless of changes in environmental conditions, or time duration, for example.

The apparatus 100 also includes a memory 110 configured to store the property, and at least one Key configured to access the stored property. In the present disclosure, the at least one Key includes a pair of Keys, and more specifically, includes a Public Key 112 and a Private Key (not shown). The Public Key 112 can be placed and stored on the apparatus 100 or the device 102; however, the Private Key is not stored on the apparatus 100 or the device 102. In addition, it is understood that the Private Key can only be accessed by authorized users/operators.

Figure 2:
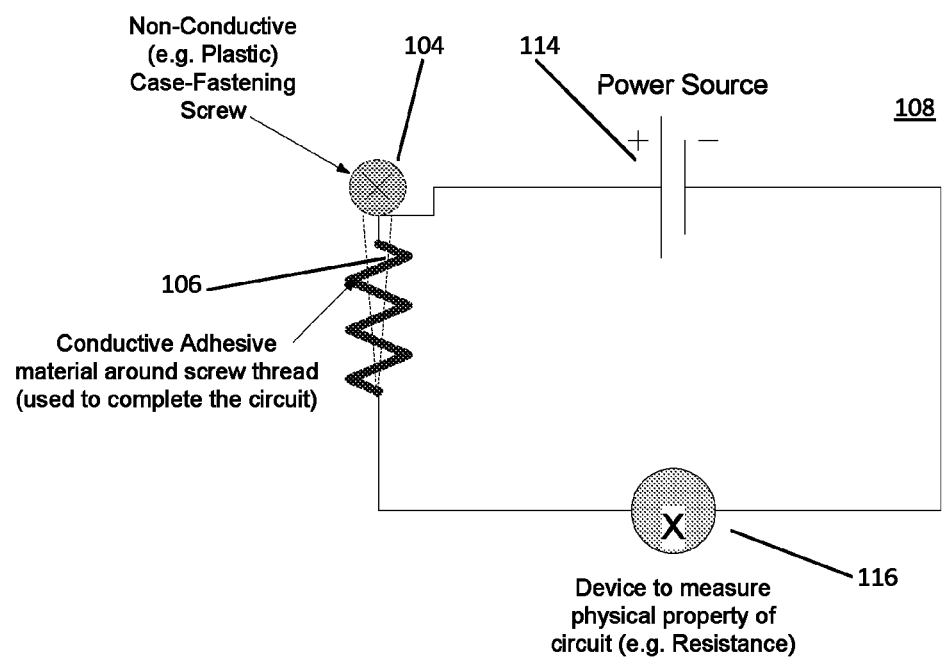
FIG. 2 is an example circuit diagram in accordance with the present disclosure.

The electric circuit 108 in accordance with the present disclosure is illustrated in FIG. 2. As seen in FIG. 2, the electric circuit 108 includes the fastener 104, adhesive 106, a power source 114, and a measuring device 116 configured to measure the physical property of the circuit (for example, the Resistance Value, as described above).

As stated above, it is impractical and sometimes impossible to determine whether or not a device/network equipment has been unlawfully accessed or tampered without physical inspection of each device. As the telecommunications networks continue to grow, such physical inspection becomes more and more costly and inefficient. However, with the present disclosure, it is possible to electronically and remotely detect and report tampering of network equipment/devices, even if such tampering occurs when the device is powered "off". As will be described in further detail below, the present disclosure provides an apparatus and method such that even if a device is tampered with when it is powered "off", detection and reporting can still occur when the device is powered back "on".

In accordance with the present disclosure and the apparatus 100, a method 300 for tamper detection is shown in FIG. 3 and includes, at S302, measuring a reference property value of a circuit, and storing the reference property value of the circuit in a device (S304). As stated above, the reference property value can be, for example, the resistance value created as a result of the conductive adhesive being secured over the non-conductive fastener. As stated above, alternative physical property values may also be possible. For example, when the apparatus 100 and device 102 are officially sealed (i.e., at a factory, or by an authorized field technician), the reference property value can be stored in a protected Log_File, which is then encrypted with the Private Key. The corresponding Public Key can be placed and stored on the apparatus 100 or device 102, while the Private Key is not stored on the apparatus 100 or the device 102. At S306, it is determined if the Log_File exists; in other words, it is determined whether or not the reference property value was measured and stored. If not, at S308, an alarm can be sent to the operator indicating that the Log_File is missing, and the method 300 ends.

If, at S306, it is determined that the Log_File does exist, then the apparatus 100 will use the Public Key to decrypt and read the reference property value from the Log_File (S310). At S312, if the reference property value is set to a "special NULL value", then the method waits a predetermined time (i.e., one hour, for example) and starts again at S306. If the reference property value is not set to a special NULL value, then a current property value of the circuit is measured (S314). At S316, the reference property value of the circuit is compared to the current property value of the circuit. If, at S316, the current property value and the reference property value are the same (within a narrow range of variation), the method waits a predetermined time and starts again at S306.

If, however, the current property value and the reference property value are not the same, it is determined that an unauthorized tampering/opening of the device 102 has occurred, and an alarm is initiated at the device, alerting the operator (S318). For example, if an unauthorized user has attempted to access/open the device 102, the cured adhesive 106, which has become brittle upon curing around the fastener 104, will break off from the fastener, causing a physical property change that is detected during the comparing at S316. In addition, if an unauthorized user successfully opened the device 102 and then attempted to apply new adhesive 106 around the fastener 104 after re-sealing the device, the measured property value of such a change would still be different than the reference property value stored in the Log_File. Accordingly, whether the device 102 is illegally opened while powered "ON", or whether it is illegally opened after powering "OFF" and then closed and powered back "ON", the present apparatus 100 and method 300 would still detect a change in the measured property value. Such a difference between the measured property value and the reference property value would indicate an unauthorized opening/tampering of the device 102.

In addition to the alarm being initiated, a report, such as a Tamper Detection Report, for example, can also be sent to the operator, indicating the time, location, and other data related to the tampering.

A general use case is now illustrated in accordance with the flow chart depicted in FIG. 4. When an authorized operator/user needs to make a legitimate change to the device 102, a method 400 in accordance with the present disclosure can be completed. At S402, the operator uses the Private Key, which is available to the operator via an application, for example, to create an encrypted Log_File that contains a special NULL value. For example, the application could reside on a remote server or on the authorized user's laptop/mobile device. The special NULL value, when read, signals the application to temporarily disable the tamper detection apparatus, allowing the operator to lawfully access the device 102 without generating false alarms. The operator can then, at S404, power OFF the device and remove the fastener 104, which would break off the brittle conductive adhesive 106. At S406, the operator can make any necessary changes/fixes to the device 102. Once the changes are made, the operator can re-seal the device by inserting the fastener 104 and applying new adhesive material 106 around the fastener (S408), thereby completing the electric circuit 108. The operator can then power ON the device 102 (S410) and wait for the adhesive 106 to cure (S412). After the adhesive 106 has cured, the operator can trigger the apparatus 100 to measure a new reference value property (S414). The operator can then use the Private Key to re-create an encrypted Log_File containing the new reference property value, securely overwriting the existing Log_File with the newly created encrypted Log_File (S416). The apparatus 100 can then continue monitoring tampering as described above and shown in FIG. 3.

Referring next to FIG. 5, a system 500 for tamper detection includes a device 502 in a telecommunications network, and an apparatus 504 secured to the device. The apparatus 504 includes a fastener, an adhesive secured to the fastener, an electric circuit (not shown) configured to measure a property; a memory 506 configured to store the measured property, and at least one Key (not shown) configured to access the property value, wherein the property value is stored on the device. As stated above with reference to FIGS. 1-3, the apparatus 504 is configured to measure a reference property value of the circuit, store the reference property value of the circuit in the device, measure a current property value of the circuit, compare the reference property value of the circuit to the current property value of the circuit, and initiate an alarm at the device if the current property value does not match the reference property value.

The apparatus 504 is configured such that when the device is opened, the adhesive is broken from the fastener, such that the current property value does not match the reference property value.

The present disclosure provides an apparatus, method, and system that can electronically and remotely detect any tampering or unauthorized opening of network equipment. In other words, there is no need to physically inspect or monitor network equipment to detect that tampering has occurred. It is also possible, utilizing the present disclosure, to detect tampering that could have occurred during device 102 being powered "OFF". Specifically, because the brittle adhesive 106 breaks during opening, it changes the physical property value of the circuit 108, and the property value change is measurable and detectable once the device 100 is later powered back "ON".

The present disclosure also provides an efficient and cost effective system, method, and apparatus for tamper detection, because it does not require actual physical inspection or monitoring by operators. Because the property value is periodically measured, and such measurement occurs automatically, it is possible to remotely and electronically detect when an unauthorized tampering has occurred.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional non-transitory computer-readable media. In the context of this document, a "non-transitory computer-readable medium" may be any media or means that can contain, store, communicate, propagate or transport the instructions for use by or in connection with an instruction execution system, apparatus, or device, such as a computer. A non-transitory computer-readable medium may comprise a computer-readable storage medium (e.g., memory or other device) that may be any media or means that can contain or store the instructions for use by or in connection with an instruction execution system, apparatus, or device, such as a computer. As such, the present invention includes a computer program product comprising a computer-readable storage medium bearing computer program code embodied therein for use with a computer, the computer program code comprising code for performing any of the methods and variations thereof as previously described. Further, the present invention also includes an apparatus which comprises one or more processors, and one or more memories including computer program code, wherein the one or more memories and the computer program code are configured, with the one or more processors, to cause the apparatus to perform any of the methods and variations thereof as previously described.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus secured to a device, comprising:
a fastener;
an adhesive secured to the fastener;
an electric circuit configured to measure a property;
a memory configured to store the property; and
at least one Key to access the stored property,
wherein if the device is tampered with when the device is powered off, the apparatus is configured to detect the tampering of the device when the device is powered back on,
wherein the device is a wireless network equipment,
wherein the memory is configured to receive and store an encrypted log file that includes a special NULL value,
wherein when the special NULL value is read, the apparatus is temporarily disabled from detection of tampering to allow authorized access of the device, and
wherein the apparatus is re-enabled to detect tampering after a new encrypted log file containing a new measured property is received and stored in the memory.

2. The apparatus of claim 1 wherein the fastener is a screw.

3. The apparatus of claim 2 wherein the adhesive is configured for being secured around threads of the screw.

4. The apparatus of claim 1 wherein the fastener is made of a non-conductive material.

5. The apparatus of claim 1 wherein the adhesive is made of a conductive material.

6. The apparatus of claim 5 wherein the adhesive is curable, and is configured to become brittle upon curing.

7. The apparatus of claim 1 wherein the electric circuit is configured to measure an electrical property value such as a resistance value formed by the adhesive being secured to the fastener.

8. The apparatus of claim 1 wherein the at least one Key includes a Public Key of a Public and Private Key pair.

9. The apparatus of claim 8 wherein a Private Key is not stored on the device.

10. The apparatus of claim 1 wherein upon an opening of the device, the adhesive is configured to break off from the fastener.

11. The apparatus of claim 1 wherein the device is at least one of an access point, micro-base station, base station, or network equipment device.

12. A method for detecting tampering of a device, the method comprising:
measuring a reference property value of a circuit;
storing the reference property value of the circuit in a device;
measuring a current property value of the circuit;
comparing the reference property value of the circuit to the current property value of the circuit; and
initiating an alarm at the device if the current property value does not match the reference property value,
wherein the alarm indicates that the device has been tampered, wherein if the device is tampered with when the device is powered off, the method further comprises detecting the tampering of the device when the device is powered back on, wherein the device is a wireless network equipment, wherein the method further comprises receiving and storing an encrypted log file that includes a special NULL value, reading the special NULL value, after the special NULL value is read, temporarily disabling tempering detection of the device to allow authorized access of the device, while tampering detection has been temporarily disabled, receiving and storing a new encrypted log file containing a new measured property, and after receiving and storing the new encrypted log file, re-enabling tempering detection of the device.

13. The method of claim 12 wherein storing the reference property value comprises storing the reference property value in a file protected with a Private Key.

14. The method of claim 13 wherein storing the reference property value further comprises storing a Public Key on the device, where the Public Key corresponds with the Private Key.

15. The method of claim 13 wherein comparing the reference property value to the current property value comprises using the Public Key to decrypt the reference property value that is encrypted by the Private Key.

16. The method of claim 12 wherein measuring the reference property value of a circuit comprises measuring an electrical property value of the circuit.

17. The method of claim 16 wherein measuring the electrical property value of the circuit comprises measuring an electrical property value of the circuit created by securing a conductive adhesive material over a non-conductive fastener.

18. The method of claim 12 wherein initiating the alarm at the device comprises sending a Tamper Detection Report to an operator of the device.

19. A system for tamper detection comprising:
a device in a telecommunications network; and
an apparatus secured to the device, the apparatus comprising:
a fastener;
an adhesive secured to the fastener;
an electric circuit configured to measure a property; and
at least one Key configured to access the property value, wherein the property value is stored on the device;
wherein the apparatus is configured to:
measure a reference property value of the circuit;
store the reference property value of the circuit in the device;
measure a current property value of the circuit;
compare the reference property value of the circuit to the current property value of the circuit; and
initiate an alarm at the device if the current property value does not match the reference property value,
wherein if the device is tampered with when the device is powered off, the apparatus is further configured to detect the tampering of the device when the device is powered back on,
wherein the device is a wireless network equipment, and
wherein the apparatus is further configured to
receive and store an encrypted log file that includes a special NULL value,
read the special NULL value,
after the special NULL value is read, temporarily disable tampering detection of the device to allow authorized access of the device,
while tampering detection has been temporarily disabled, receive and store a new encrypted log file containing a new measured property, and
after receiving and storing the new encrypted log file, re-enable tempering detection of the device.

20. The system of claim 19 wherein the apparatus is configured such that when the device is opened, the adhesive is broken from the fastener, such that the current property value does not match the reference property value.

* * * * *